United States Patent [19]

Shah

[11] Patent Number: 4,803,232

[45] Date of Patent: Feb. 7, 1989

[54] RUBBER-MODIFIED EPOXY ADHESIVE COMPOSITIONS

[75] Inventor: Dilipkumar N. Shah, Erie, Pa.

[73] Assignee: Lord Corporation, Erie, Pa.

[21] Appl. No.: 79,414

[22] Filed: Jul. 30, 1987

[51] Int. Cl.[4] .......................... C08K 5/05; C08L 9/02; C08L 63/00

[52] U.S. Cl. .................................. 523/456; 523/216; 523/467; 525/109; 525/112; 528/88

[58] Field of Search ...................... 525/112, 420.5, 109; 528/111.3; 523/216, 456

[56] References Cited

U.S. PATENT DOCUMENTS

| | | | |
|---|---|---|---|
| 3,873,638 | 3/1975 | Olson | 525/112 |
| 4,051,195 | 9/1977 | McWhorter | 260/837 R |
| 4,107,116 | 8/1978 | Riew et al. | 260/23 EP |
| 4,129,670 | 12/1978 | Riew | 427/386 |
| 4,397,998 | 8/1983 | De La Mare | 525/420.5 |
| 4,426,243 | 1/1984 | Briggs | 156/307.3 |
| 4,565,853 | 1/1986 | Herscovici et al. | 525/530 |
| 4,578,424 | 3/1986 | Goel | 525/109 |

FOREIGN PATENT DOCUMENTS 58-215463 12/1983 Japan ................... 528/111.3

OTHER PUBLICATIONS

*Fusor 320* Literature, Lord Corporation, 1986.

Primary Examiner—C. Warren Ivy
Attorney, Agent, or Firm—Larson and Taylor

[57] ABSTRACT

An epoxy adhesive composition for the bonding of SMC to metal substrates and other SMC parts having an improved cure rate and hence rate of initial lap shear strength development has been discovered. The adhesive composition comprises an epoxy resin and a polyacrylate or polymethacrylate cured with a combination of an amine-functional butadiene-acrylonitrile rubber, at least one aliphatic or aromatic polyamine and at least one polyamide.

12 Claims, No Drawings

RUBBER-MODIFIED EPOXY ADHESIVE COMPOSITIONS

BACKGROUND OF THE INVENTION

Field Of The Invention

This invention relates to epoxy adhesive compositions. More particularly, the invention relates to epoxy adhesive compositions which are suitable for use in bonding rigid fiber-reinforced plastic composite materials to other materials of like or dissimilar composition, including metal materials which are coated with corrosion protection coatings.

The use of rigid fiber-reinforced plastic composite materials in the form of sheet molding compounds (commonly referred to as SMC) as an alternative for steel automotive body panels in an effort to reduce weight and corrosion susceptibility is increasing. Sheet molding compound can be described as reinforced resin compositions typically comprising unsaturated liquid polyester resin, ethylenically-unsaturated monomer, low profile thermoplastic resin, inert filler, magnesium oxide or other maturation aids and shaped or milled glass fiber reinforcement. The molding of the SMC under heat and pressure results in the formation of a rigid, self-supporting, thermoset, fiber-reinforced SMC part.

The rigid SMC parts are typically bonded to other rigid SMC parts, which may or may not originate from the same manufacturer, or to metal panels and structural members, in lieu of mechanical attachments. Reactive multi-component thermoset adhesives such as peroxide-cured unsaturated polyester, polyol polyurethane and epoxy adhesive compositions have typically been the adhesives most commonly employed in bonding these fiber reinforced plastic composite SMC materials. However, there are no adhesives whose performance is sufficiently stellar as to preclude the further development of structural adhesives for bonding reinforced plastic composite SMC materials.

Moreover, automotive adhesives must perform over a wide range of operating conditions, including temperatures on the order of 200.C which are encountered during paint bake cycles to below 0.C in cold weather climates, and environmental conditions such as exposure, oils, greases, humidity and high salinity. For example, one specification requires that SMC/metal adhesives withstand a torsional shear impact loading of 17 in. lb. per sq. in. at −29.8.C. Standard epoxy adhesives cured with polyamidoamine curatives barely meet this minimum value, with the failure mode being adhesive to the metal surface. If the metal is coated with an organic corrosion inhibiting coating, the failure is typically between the corrosion inhibiting coating and the metal, rather than the desired failure within the SMC adherent. Another specification commonly required of automotive adhesives is that they be capable of bonding SMC parts without the need to further prepare or treat the SMC surface prior to bonding.

Attempts to improve the low temperature impact performance of SMC/metal assemblies by increasing the flexibility of the adhesive have resulted in impact values per se. However, the failure mode remained adhesive at the metal interface or between the corrosion-inhibiting coating and the metal, when the metal was so coated. In addition, the flexibilized epoxy compositions suffer from a decrease in cohesive strength at higher temperature. These failures have been alleviated in large part by curing the epoxy resin with a combination of amine curing agents that include polyamines, polyamides and amine-terminated acrylonitrile-butadiene rubbers. However, the cure rate and hence the rate of initial lap shear strength development of these adhesive compositions is less than desired.

SUMMARY OF THE INVENTION

The present invention is directed to epoxy adhesive compositions which in addition to possessing properties desired for automotive assembly line bonding of rigid SMC part as, for example, high impact strength, environmental resistance, high and low temperature performance and flexibility, also exhibit an increased rate of cure and hence an increased rate of initial lap shear strength development. In addition, the epoxy adhesive compositions of the invention eliminate the need for surface preparation prior to bonding. Consequently, the adhesive compositions of the invention allow for faster production rates in the adhesive bonding of SMC parts.

In another aspect of the invention there are provided epoxy adhesive composition which effectively bond SMC to metal substrates, particularly phosphatized metals, but also to other SMC parts. In a second aspect of the invention there is provided a method of bonding SMC to substrates selected from the group consisting of SMC and metals, including metals coated with organic corrosion inhibiting compositions.

These and other objects of the invention are provided by an adhesive compositions comprised of a Component A comprising:

(a) about 50 to 95, preferably about 60 to 90, parts by weight of at least one epoxy resin having more than one epoxy group, and (b) about 5 to 50, preferably 10 to 20, parts by weight of polyacrylate or polymethacrylate ester containing at least one terminal acrylate or methacrylate group, and a Component B comprising (c) an amine functional (i.e. amine terminal) butadiene-acrylonitrile rubber;

(d) at least one aliphatic or aromatic polyamine; and (e) at least one polyamide, wherein the amount of (c) is about 5 to 40, preferably about 12 to 26, weight percent, the amount of (d) is about 2 to 30, preferably about 4 to 25, weight percent and the amount of (e) is about 8 to 30, preferably about 10 to 25 weight percent, the amounts of, (c) through (e) being based on the total weight of (a), (b), (c), (d) and (e).

In a preferred embodiment, there is included in Component A about 1.0 to 5.0 parts of polyol per 100 parts of Component A and in Component B about 100 to 400 parts of activated silica per 100 parts of polyol.

In yet another preferred embodiment of the invention Component B further includes about 50 to 70, preferably about 55 to 60, weight percent of at least one hydroxy-substituted aromatic hydrocarbon based on the total weight of the hydroxy-substituted aromatic compound and polyamine hardener.

DESCRIPTION OF THE PREFERRED EMBODIMENTS

Component A

The epoxy compounds which are suitable for use in the practice of the invention can be any monomeric or polymeric compound or mixtures of compounds having an epoxy equivalency greater than one, that is, wherein the average number of epoxy groups per molecule is greater than one, with monomeric epoxides having two epoxy groups being currently preferred. Epoxy compounds are well-known. See, for example, U.S. Pat. Nos. 2,467,171; 2,615,007; 2,716,123; 3,030,336; and 3,053,855. Useful epoxy compounds include the polyglycidyl ethers of polyhydric polyols, such as ethylene glycol, triethylene glycol, 1,2-propylene glycol, 1,5-pentanediol, 1,2,6-hexanetriol, glycerol and 2,2-bis(4-hydroxy cyclohexyl) propane; the polyglycidyl esters of aliphatic or aromatic polycarboxylic acids, such as oxalic acid, succinic acid, glutaric acid terephthalic acid, 2,6-naphthalene dicarboxylic acid and dimerized linoleic acid; the polyglycidyl ethers of polyphenols, such as bis-phenol A, 1,1-bis(4-hydroxyphenyl) ethane, 1,1-bis)4-hydroxyphenyl) isobutane, and 1,5-dihydroxynaphthalene; and novolak resins; with the aromatic and cycloaliphatic polyglycidyl compounds being currently preferred. Generally the preferred epoxy compounds are resins having an epoxide equivalent weight of about 100 to 2000, preferably about 110 to 500.

The acrylate and methacrylate esters of the invention contain more than one acrylate or methacrylate group and are the acrylic and methacrylic esters of aliphatic polyhydric alcohols such as, for example, the di- and polyacrylates and the di- and polymethacrylates of alkylene glycols, alkoxylene glycols, alicyclic glycols and higher polyols, such as ethylene glycol, triethylene glycol, tetraethylene glycol, tetramethylene glycol, hexanediol, trimethylolethane, trimethylolpropane, pentaerythritol, dipentaerythritol, tripentaerythritol and the like, or mixtures of these with each other or with their partially esterified analogs.

Illustrative of these esters are trimethylolpropane triacrylate, trimethylolethane triacrylate, trimethylolpropane timethyacrylate, trimethylolethane trimethacrylate, tetramethylene glycol dimethacrylate, ethylene glycol dimethacrylate, triethylene glycol dimethacrylate, pentaerythritol triacrylate, pentaerythritol tetraacrylate, 1,6-hexanediol diacrylate, 1,6-hexanediol dimethacrylate, dipentaerythritol tetraacrylate, dipentaerythritol pentaacrylate, and the like. Particularly preferred esters are 1,6-hexanediol diacrylate, trimethylolpropane triacrylate, pentaerythritol triacrylate, and pentaerythritol tetraacrylate.

Also suitable are the acrylate or methacrylate esters of epoxide resins, wherein epoxide resins as used herein are considered to be polyols. The epoxide resins useful in reacting with acrylic or methacrylic acid are those epoxide resins described hereinbefore. The procedures for preparing these acrylate and methacrylate esters of epoxide resins is described in U.S. Pat. No. 3,377,406 which is hereby incorporated by reference.

Component B

Component B is the curing agent component of the adhesion composition and is comprised of a combination of an amine terminal butadiene-acrylonitrile rubber, at least one aliphatic or aromatic polyamine and at least one polyamide. The presence of each of these hardeners in the defined proportions is essential to the invention otherwise the properties and performance characteristics desired in the final adhesive composition are not achieved and maintained. For example, if an amine-terminal butadiene-acrylonitrile rubber curing agent is not included, not only does the adhesive lack sufficient flexibility at room temperature but the bond loses adhesive strength. Also, the amine-terminal acrylonitrile-butadiene rubber curing agent enables SMC parts to be bonded without the necessity of preparing the surfaces prior to bonding. It has believed that the highly polar CN groups of this liquid rubber curing agent "grab" even unprepared SMC surfaces with a tenacity not experienced with other curing agents. The polyamine curing agent, on the other hand, is included in the adhesive composition so as to meet high temperature lap shear strength specifications. Lastly, the principle role of the polyamide curing agent in the adhesive composition is to impart flexibility.

The amine-terminated butadiene-acrylonitrile curing agents are liquid elastomers that normally contain an acrylonitrile content of about 5 to 40, preferably 12 to 26, percent by weight and a butadiene content of 95 to 60, preferably 78 to 74, percent by weight, based on the liquid butadiene-acrylonitrile copolymer. Generally, the amine-terminated butadiene-acrylonitrile copolymers contain an average from about 1.7 to about 3 primary and/or secondary amine groups per molecule, preferably about 1.7 to about 2.3 primary or secondary amine groups per molecule and may have Brookfield viscosities measured at 27.C of about 500 cps to about 2,500,000 cps, preferably about 500 cps to about 500,000 cps. The amine-terminated butadiene-acrylonitrile copolymers of the invention are well known articles of commerce and can be prepared by reacting a carboxyl-terminated or ester-terminated butadiene-acrylonitrile copolymer with at least one aliphatic, alicyclic or heterocyclic amine containing at least two primary and/or secondary amine groups. The amine-terminated liquid copolymers may also be prepared by reacting an acid chloride-terminated butadiene-acrylonitrile with at least one of the aforementioned amines. The methods of preparation are described in more detail in, for instance, U.S. Pat. No. 4,129,670, hereby incorporated by reference.

Aliphatic polyamines which are preferred for use in the practice of the invention contain at least 2, preferably 2 to 5 primary and secondary amine groups. Examples of such amines are polyalkylene polyamines, e.g. diethylene triamine, triethylene tetramine, tetraethylene pentamine and pentaethylene hexamine. Other useful aliphatic amines are ethylene diamine, tetramethyl diamine, hexamethylene diamine and the like. Aliphatic polyamines which are modified as by adduction with epoxy resins, alkylene epoxides or acrylonitrile or by condensation with fatty acids or Mannich bases can also be employed in the adhesives of this invention. Aroatic polyamines wherein the amine groups are directly attached to the aromatic ring, such as xylylene diamine and the like, can also be used in the practice of the invention but are less preferred to their aliphatic counterparts.

The polyamidoamine harDeners of the adhesive composition of the invention are typically reaction products of aliphatic amines with dimerized fatty acids of 12 to 28 carbon atoms. These polyamides are well known and commerically available. A typical example is Versamid 140 which is a polyamidoamine of dimerized linoleic acid.

Optional Additives

When it is desired to enhance the non-sag characteristics of the adhesive compositions of the invention the compositions may optionally include a mixture of a polyol and activated silica such as fuming silica.

It has been found that the activated silica combines with the polyol to provide hydrogen-bonding that is reactive with the amine groups of the curing agents of Component B to provide the thixotropic properties necessary to enhance non-sag characteristics of the adhesive composition.

The polyols that may be included in combination with the activated silica are well-known articles of commerce and are commonly referred to as polyalkylene glycols or polyalkylene ether glycols. They may be represented by the formula $HO(RO)_nH$, in which R is an alkylene radical and n is at least 2. The alkylene radical can be a single chain or can consist of two or more alkylene chains separated from each other by an ether oxygen atom. Preferred poly(alkylene oxide) polyols have from 1 to 9, preferably 1 to 6 carbon atoms in the alkylene chain separating each pair of oxygen atoms and have a number average molecular weight in the range from about 100 to about 4000, preferably about 100 to about 2500. Not all the alkylene units need be the same. Poly(alkylene oxide) polyols formed by the copolymerization or condensation of mixtures of different cyclic ethers, glycols, or glycols and cyclic ethers can be used; as can poly(alkylene oxide) polyols derived from cyclic ethers such as dioxolane, which affords a polyol having the formula $HO(CH_2OCH_2CH_2O)_nH$ where n is greater than 1. The alkylene unit can be a straight or a branched chain, as a poly(propylene oxide) polyol. In the case where the alkylene unit is ethylene, it can be advantageous to incorporate the unit into a copolymer, for example, as a copolymer of ethylene oxide and propylene oxide, with up to 80 percent of such copolymer comprising ethylene oxide. Representative poly(alkylene oxide) polyols include poly(ethylene oxide) polyols, poly (propylene oxide) polyols, poly(tetramethylene oxide) polyols, poly(nonamethylene oxide) polyols, poly(oxymethylene-ethylene) oxide) polyols, poly(ethylene oxide-propylene oxide copolymer) polyols, and poly(pentaerythritol-ethylene oxide) polyols. Thus the poly(alkylene oxide) polyols will generally have from 2 to 6 hydroxyl groups, with polyols having 2 hydroxyl groups being currently preferred. Particularly preferred is diethylene glycol.

When employed, the mixture of activated silica and polyol generally form part of Component A. The polyol is usually added in an amount of 1.0 to 5.0 parts per 100 parts of Component A and the activated silica in an amount of 100 to 400 parts per 100 parts of the polyol.

Although optional, it is preferred to include along with the polyamine hardener a hydroxy, ring-substituted, aromatic hydrocarbon such as phenol, polyphenol and the like. It has been found that the hydroxy-substituted aromatic compound increases the cure rate of the epoxy resin of Component A by bringing it in line with the cure rate of the polyacrylate or polymethacrylate ester of Component A. The mechanism by which it does so is not known for certain but it is believed that the hydroxy-substituted aromatic hydrocarbon reacts preferentially and more readily with the epoxy resin, opening its epoxy ring and readying it for reaction with the amine hardeners present. This reaction occurs substantially simultaneously with the reaction of the polyacrylate or polymethacrylate esters with the amines. When employed, the hydroxy-substituted aromatic compound is added in an amount ranging from about 50 to 70, preferably about 55 to 60 percent by weight, based on the total weight of the hydroxy-substituted aromatic compound and polyamine hardener.

The adhesive compositions of the invention can also contain conventional additives normally found in epoxy adhesives, such as talc, metal powders, titanium dioxide and the like. Such additives are incorporated in current ratios well known to practitioners in the art of epoxy adhesives.

In production, the adhesives are provided as two-part compositions, i.e., a Component A and a Component B. The parts are metered and mixed together immediately before use in a weight ratio of Component A:Component B ranging from 0.5:1 to 10:1, preferably 0.8:1 to 6:1. After mixing, the adhesive is sufficiently viscous to form a discrete bead when extruded onto a surface and has a pot life of at least 30 minutes at ambient temperature. The adhesives are curable at ambient temperatures but are preferably cured at temperatures in the range from 70° C. to 190.C at which temperatures cure is effected in 5 minutes or less dependent on temperature.

The adhesives of this invention are especially suited to bonding fiber reinforced unsaturated resin sheet molding compound (SMC) parts to other SMC parts or metals. A bead of adhesive is applied to at least one of the surfaces which are to be bonded, the parts are mated together and the assembly is heated at a temperature in the range from 70 C to 190° C for 2 to 5 minutes. At times a post-bake at temperatures in the range from 100. to 205.C for 5 to 30 minutes ca be beneficial in enhancing properties such as heat and environmental resistance. While the adhesives can be applied by any conventional method as by roll coater, brush, curtain coater, extrusion and hand rollers, robotic dispensing machines are preferred.

The following examples are illustrative of the invention.

EXAMPLE I

Invention Adhesive I was prepared by blending the Component A and Component B, in a ratio of 1:1.2 by weight. The formulations which made up Component A and Component B were as follows:

| Component A | Grams |
| --- | --- |
| Bisphenol A epoxy resin (Epon 828 of Shell Chemical Co.) | 32.5 |
| Epi-Rez (Celanese Corp., a 60/40 blend of Epon 828 and polyacrylate ester)* | 19.8 |
| Diethylene glycol | 1.3 |
| Fumed silica | 1.7 |
| TiO$_2$ | 0.8 |
| White Talc | 43.9 |

| Component B | Grams |
| --- | --- |
| Ancamine AD[1] | 19.0 |
| Versamid 140[2] | 17.3 |
| ATBN 1300 × 16[3] | 29.5 |
| White talc | 13.47 |
| Aluminum | 16.73 |
| Fumed silica | 4.0 |

[1]A trademarked material of Pacific Anchor Chemical Corp comprised of approximately 55-60/40-45 blend of phenol/aliphatic amine having the following typical properties:

| | |
| --- | --- |
| Color (Gardner) | 8 |
| Viscosity at 77° F., poise | 17 |
| Amine Value, mg KOH/g | 485 |
| Specific gravity at 77° F. | 1.08 |
| Density (lb/gal) at 77° F. | 9.0 |
| Flash point (closed cup) °F. | 198 |
| Equiv. wt. per [H] | 107 |

-continued (2)A trademarked material of Henkel, USA prepared by condensing a dimerized linoleic acid with a polyamine, said material having an amine value (mg KOH/gram resin) of 385, a viscosity at 25° C. - poise of 116 and a % solids of 100.
(3)A product of B. F. Goodrich comprised of amine-terminated butadiene-acrylonitrile copolymer rubber having a Brookfield viscosity at 27° C. of 2350 poise, a total amine equivalent of 900 and an acrylonitrile content of 16%.
*Further identified in U.S. Pat. No. 4,051,195.

Comparative Adhesive II was similarly prepared but substituting 19.8 grams of Bisphenol A epoxy resin (Epon 828) for the Epi-Rez ingredient used in Component A.

The cure rate of Invention Adhesive I was then compared to the cure rate of Comparative Adhesive II by subjecting the adhesives to lap shear strength tests over a period of time. The results are shown in FIGS. 1, 2 and 3 which represent graphs of the lap shear strength tests vs. time. As can be seen from the results, the adhesive composition of the invention (Invention Adhesive I) cures faster and develops initial lap shear strength faster than does Comparative Adhesive II.

EXAMPLE II

Invention Adhesive I prepared as described in Example I above was employed to bond fiber reinforced sheet molding compound (SMC) parts to other SMC parts. Individual parts were wiped with a dry rag, otherwise none of the surfaces were prepared or treated in any manner before bonding. The Invention Adhesive I was applied at a dry film thickness of 30 mil and the bonded assemblies were cured at 200° F for 10 minutes and at 300° F. for 30 minutes. The bonded assemblies were then tested on an Instron testing machine at a pull rate of 0.5 inches per minute. The lap shear strength results under various pressures, temperatures, and water-soaking for seven days, were as follows:

| Lap Shear Strength At R.T. |
| --- |
| 1. 556 PSI 100% FT |
| 2. 717 PSI 100% FT |
| 3. 772 PSI 100% FT |
| 4. 848 PSI 100% FT |
| 5. 655 PSI 100% FT |
| AVG. 796 PSI |
| Lap Shear Strength at 180° F. |
| 1. 204 PSI 100% COH |
| 2. 244 PSI 100% COH |
| 3. 222 PSI 100% COH |
| 4. 243 PSI 100% COH |
| 5. 216 PSI 100% COH |
| AVG. 226 PSI |
| Lap Shear Strength at −40° C. |
| 1. 730 PSI 100% FT |
| 2. 690 PSI 100% FT |
| 3. 640 PSI 100% FT |
| 4. 650 PSI 100% FT |
| 5. 630 PSI 100% FT |
| AVG. 668 PSI |
| Lap Shear Strength After 7 Day Water Soak Tested Immediately |
| 1. 649 PSI 100% FT |
| 2. 751 PSI 100% FT |
| 3. 683 PSI 100% FT |
| 4. 692 PSI 100% FT |
| 5. 723 PSI 100% FT |
| Lap Shear Strength After 7 Day Water Soak Tested After 24 Hour Recovery |
| 1. 706 PSI 100% FT |
| 2. 722 PSI 100% FT |
| 3. 692 PSI 100% FT |
| 4. 728 PSI 100% FT |
| 5. 694 PSI 100% FT |

The bonded assemblies exhibited 100% of fiber tear (FT) in all instances except those tested at a temperature of 180° F. in which case the assemblies exhibited 100% cohesion (COH).

Invention Adhesive I was also employed to bond 4"×4" SMC parts, with no surface preparation on the parts. The adhesive film thickness applied was 30 mil. The bonded assemblies were cured at 200° F. fo 10 minutes and at 300° F. for 40 minutes and tested in accordance with the OCF Wedge Test (SAE Test NO. J 1882), using a 30" wedge with compressive load being applied at a crosshead speed of 0.5 in./min. The bonded assemblies experienced 100 percent fiber tear in all instances.

It is claimed:

1. An adhesive composition comprising a Component A comprising
   (a) about 50 to 95 parts by weight of at least one epoxy resin having more than one epoxy group, and
   (b) about 5 to 50 parts by weight of acrylate or methacrylate ester of aliphatic polyhydric alcohol and as a curing agent Component B comprising
   (c) an amine-terminal butadiene-acrylonitrile rubber;
   (d) at least one aliphatic or aromatic polyamine; and
   (e) at least one polyamidoamine derived from dimerized fatty acids of 12 to 28 carbon atoms and aliphatic amines;
   wherein the amount of (c) is about 5 to 40 weight percent, the amount of (d) is about 2 to 30 weight percent and the amount of (e) is about 8 to 30 weight percent, the amount of (c) through (e) being based on the total weight of (a), (b), (c), (d) and (e).

2. An adhesive composition according to claim 1 wherein Component A comprises about 10 to 20 parts by weight of said acrylate or methacrylate ester and the amount of said epoxy resin comprises about 90 to 80 parts by weight.

3. An adhesive composition according to claim 1 wherein the ester is acrylate ester.

4. An adhesive composition according to claim 3 wherein the acrylate ester is 1,6-hexandiol diacrylate.

5. An adhesive composition according to claim 3 wherein the acrylate ester is trimethylol propane triacrylate.

6. An adhesive composition according to claim 1 wherein the epoxy resin is a glycidyl polyether or polyester having an epoxide equivalent of about 100 to 2000.

7. An adhesive composition according to claim 6 wherein the epoxy resin is a glycidyl polyether of bis(4-hydroxyphenyl)-2,-propane.

8. An adhesive composition according to claim 1 including about 1.0 to 5.0 parts of a polyol per 100 parts of Component A and about 100 to 400 parts of activated silica per 100 parts of polyol.

9. An adhesive composition according to claim 8 wherein the polyol is an aliphatic polyol.

10. An adhesive composition according to claim 9 wherein the aliphatic polyol is diethylene glycol.

11. An adhesive composition according to claim 1 wherein Component B further includes about 50 to 70 weight percent of a hydroxy-substituted aromatic hydrocarbon based on the total of the hydroxy-substituted aromatic hydrocarbon and polyamine.

12. An adhesive composition according to claim 11 wherein the hydroxy-substituted aromatic hydrocarbon is phenol.

* * * * *